United States Patent

Junker

[11] Patent Number: 5,807,164
[45] Date of Patent: Sep. 15, 1998

[54] METHOD AND DEVICE FOR REGRINDING GROOVED TOOLS

[76] Inventor: Erwin Junker, Junkerstrasse 2, D-77787 Nordrach, Germany

[21] Appl. No.: 836,517
[22] PCT Filed: Nov. 2, 1995
[86] PCT No.: PCT/EP95/04304
  § 371 Date: May 9, 1997
  § 102(e) Date: May 9, 1997
[87] PCT Pub. No.: WO96/17710
  PCT Pub. Date: Jun. 13, 1996

[30]   Foreign Application Priority Data

Dec. 5, 1994  [DE]  Germany ........................... 44 43 213.5

[51] Int. Cl.⁶ ........................................................ B24B 3/30
[52] U.S. Cl. .................................. 451/47; 451/48; 451/8; 451/409; 451/220
[58] Field of Search .................................. 457/47, 48, 438, 457/439, 409, 374, 375, 8–10, 220, 222, 403

[56]   References Cited

U.S. PATENT DOCUMENTS 1,694,074  12/1928  Martone .
3,663,190   5/1972  Fisk ............................................ 451/8
3,675,372   7/1972  Kushigian .
4,157,635   6/1979  Ward ........................................ 451/220
5,551,906   9/1996  Helgren ....................................... 451/8

FOREIGN PATENT DOCUMENTS 1455182  12/1966  France .
 955124   7/1956  Germany .
3107039C2  9/1982  Germany .

Primary Examiner—Robert A. Rose
Assistant Examiner—George Nguyen
Attorney, Agent, or Firm—Jordan and Hamburg

[57]   ABSTRACT

The invention relates to a method and to a device for regrinding tools having straight or helical grooves with the help of a positioning head, which is provided with a feeler pin, which engages a groove and which, in the direction of advance, is disposed in front of the grinding disk. In order to make it possible to regrind the tool over the whole of its length, it is proposed pursuant to the invention that a positioning head with two feeler pins be used, the first feeler pin, which leads the grinding disk, being retracted from the groove before entry into the groove outlet or, if this groove runs out into the open, before leaving this groove and the second feeler pin, which is rigidly connected with the positioning head, trailing the grinding disk and, after removal of the first feeler pin from the groove, taking over the guidance of the spindle sleeve of the spindle head of the workpiece.

8 Claims, 4 Drawing Sheets

METHOD AND DEVICE FOR REGRINDING GROOVED TOOLS

BACKGROUND OF THE INVENTION

The invention relates to a method and a device for regrinding tools with straight and helical grooves with the help of a positioning head, which is provided with a feeler pin, which engages a groove and, in the advancing direction, is disposed in front of the grinding disk.

As is generally known to those skilled in the art, there are basically two possibilities for regrinding tools with straight and helical grooves.

On the one hand, a machine is used with numerical control for the individual axial movements. These machines are relatively expensive to acquire and are very suitable for a larger number of units; however, it is necessary to know the exact geometry of the tool, which is to be reground, or to measure this geometry before the regrinding of the grooved tool so that these values can be taken over in the control system.

A further possibility for regrinding grooved tools consists of using a manually controlled regrinding machine, which has an advantageous purchase price and is also suitable for a smaller number of units. For the regrinding, the tool, which is, for example, helically grooved, is clamped at one end of its shaft by a chuck, a collet, a conical retainer or a different spindle sleeve. The spindle sleeve is shifted manually in the advancing direction. The tool geometry in relation to the slope of the helix need not be known, because the guidance of the tool, which is to be ground, is restricted by a feeler pin. During the grinding process, this feeler pin engages a helical groove of the tool, which is to be reground. The slope of the groove corresponds to the slope of the contour, which is to be reground. Since the grinding tool (grinding/disk), upon entering the zone that is to be ground, has to be guided accurately by the feeler pin at the tool that is to be reground, the feeler pin is disposed some distance in front of the grinding disk in the advancing direction. Due to this lead of the feeler pin in front of the grinding disk, the feeler pin is in the outlet region of the helical groove ahead of the grinding disk. As soon as the feeler pin leaves the region of the completely formed groove profile, the grinding process must be stopped, as otherwise either the reground contour is distorted or the tool which is to be reground, is ground incorrectly and thus becomes useless. A similar effect occurs when the feeler pin leaves a groove, which runs out into the open. The profile, which is to be reground on the tool, cannot be reground over the whole of its length with this method. A method or a device of the type described above is presumed known in the introductory portion of claim 1 and of claim 4.

SUMMARY OF THE INVENTION

It can be inferred as known from the French publication 1,455,182 that, for regrinding a tool, a positioning head with two feeler pins is used. The tool is a rotating knife carrier, provided with individual cutting tools and, for the positive engagement of the feeler pins, grooves are provided on this knife carrier. However, these grooves are of no importance for the functioning of the tool.

For a manually controlled regrinding machine, it is the object of the invention to develop the known method or the known device further, so that regrinding of the profile, which is to be reground, becomes possible with the highest precision over the whole length of the profile.

Pursuant to the invention, this objective is accomplished, for the method, with the distinguishing features of claim 1 and, for the device, with the distinguishing features of claim 4.

It is of decisive importance to work with a retractable feeler pin, which leads the grinding disk, and with a second feeler pin, which is rigidly connected with the positioning head and trails the grinding disk. It becomes possible owing to the fact that, for grinding the start of the groove, the first, retractable feeler pin guides, while subsequently, over a certain length of groove, both feeler pins guide simultaneously. After the second feeler pin has entered the groove of the tool that is to be reground, the first feeler pin may be retracted. However, it must be retracted before entry into the the groove outlet. As soon as the first feeler pin is retracted before entering the groove outlet or leaves the groove that runs out into the open, the second feeler pin takes over the guidance of the spindle sleeve of the workpiece spindle head. As a result, the shaving breast of the groove or the casing bevel of the tool that is to be reground, for example, can be reground over the whole of its length. The two feeler pins must be adjustable easily and within a short time to different tool geometries.

Above all, the different groove shapes, tool dimensions and helical angles of the grooves of the tool, which is to be reground, must be taken into consideration here. The positioning head with the two feeler pins is fastened to a clamping holder, which is mounted on the grinding table. In order to be able to convert the positioning head for different grinding tasks as simply and as rapidly as possible, the clamping holder is constructed so that it can be loosened by hand with a central locking screw and, after the adjustment, be tightened once again by this screw.

In the loosened state, the joints of the clamping holder are freely movable, so that the positioning head can be adjusted to the desired position. After this adjustment to the desired position, the locking screw is tightened by hand and the joints are now rigid.

Advantageous further embodiments of the method of claim 1 are the object of claims 2 and 3 and advantageous further embodiments of the device of claim 4 are the object of claims 5 to 8.

In the following, the invention is explained in greater detail by means of examples shown in the drawing, in which

BRIEF DESCRIPTION OF THE INVENTION

FIG. 1 diagrammatically shows a device, constructed pursuant to the invention, in front elevation, FIG. 2 shows a side view, partially in section, of the device shown in FIG. 1, perpendicularly to the representation of FIG. 1, FIG. 3 shows the positioning head with the two feeler pins in a partially sectional front elevation, the first feeler pin being shown in the extended position, FIG. 4 shows a representation corresponding to that of FIG. 3, with a retracted feeler pin, FIGS. 5 and 6 show various operating examples.

DETAILED DESCRIPTION OF THE INVENTION

Figure 1:
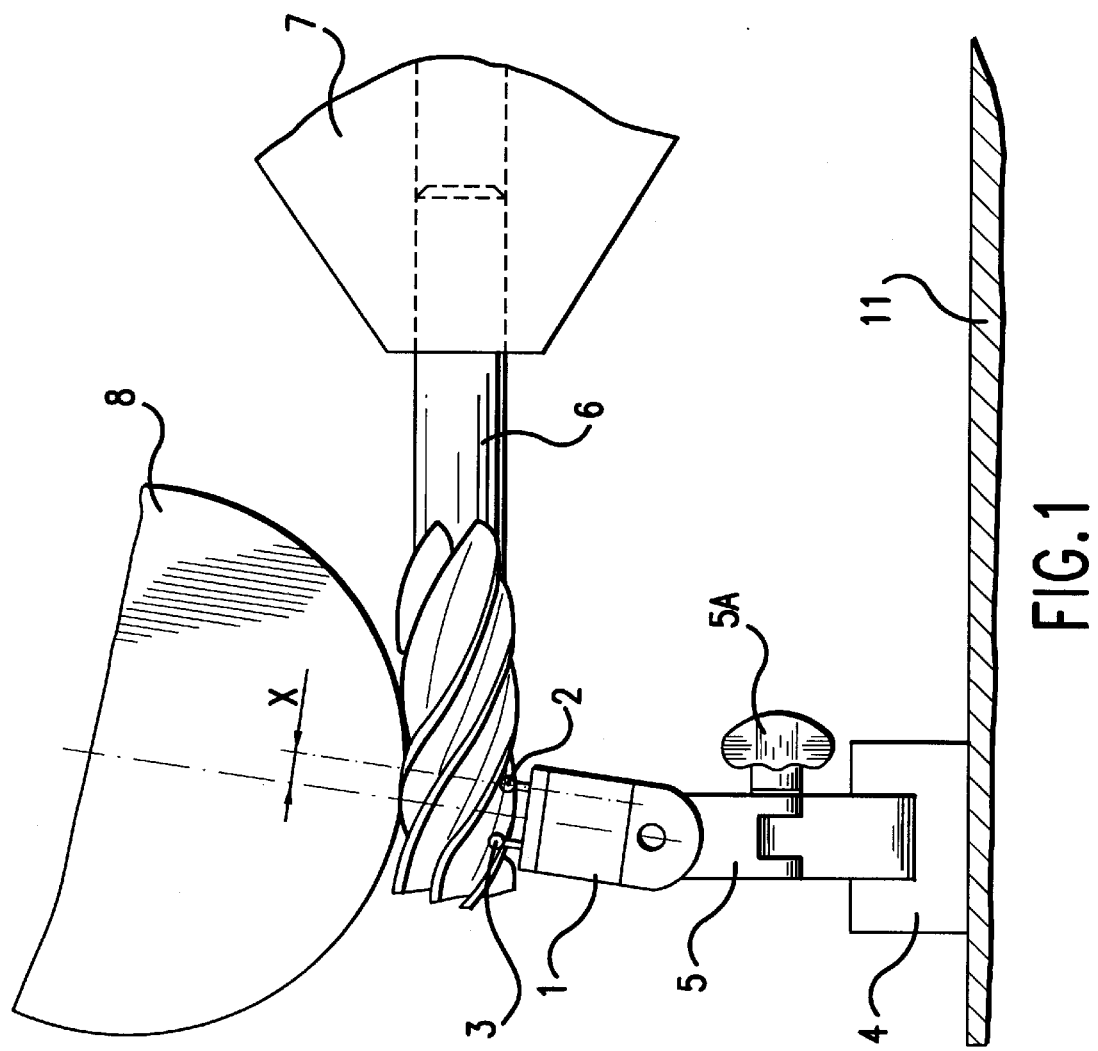

FIG. 1 shows that a positioning head 1 is provided with two feeler pins 2, 3. The positioning devices consists of the positioning head 1, a clamping holder 5 in the form of freely movable, articulated arms, which clamping holder 5 can be fixed by a locking screw 5A in any set position, and a holder 4, with which the clamping holder 5 is fixed to the grinding table 11. The freely movable clamping holder 5 of the positioning device offers the possibility of being able to adjust the positioning head 1 with the two feeler pins 2, 3 very rapidly and very accurately to the groove, which is to be probed, on the tool 6, which is to be reground. The grinding table 11 is provided with guides so that the table can be moved longitudinally for adjustments. The guides are intended to bring the tool, which is to be reground, into an appropriate longitudinal position. Moreover, a tool spindle head is mounted on the grinding table 11 and accommodates a spindle sleeve, which can be moved very easily axially and radially and carries out the advancing motion during the grinding. At the front end of the spindle sleeve, a collet chuck 7, for example, is mounted, which accommodates the tool 6 that is to be reground. However, other clamping elements can also be used here for clamping the tool 6 that is to be reground. This depends on the possibilities for accommodating the respective tool 6 that is to be reground. The regrinding is accomplished by a grinding disk 8. Since the tool 6 that is to be reground must already be guided accurately in the axial direction when the grinding disk 8 enters the tool 6 that is to be reground, the first feeler pin 2 leads the grinding disk 8 by a certain distance, while the second feeler pin 3 trails the grinding disk. The lead of the first feeler pin 2 ahead of the grinding disk 8 is determined by the grinding geometry and the grinding delivery and results in a measure x.

Figure 2:
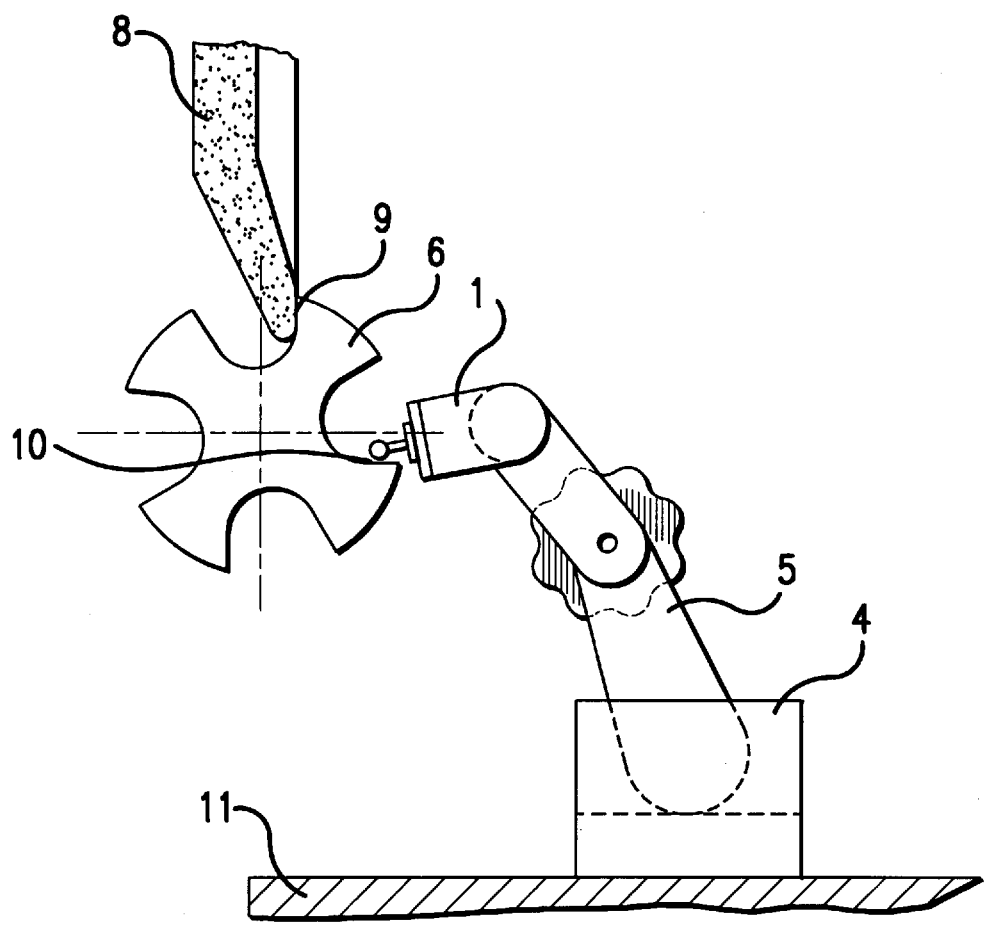

FIG. 2 shows the engagement of the grinding disk 8 during the regrinding of the face 9 of the tool 6. The positioning device with the feeler pins 2 and 3 engages an adjacent groove 10, the slope of which corresponds to the slope of the groove profile or the casing bevel, which is to be reground.

Figure 3:
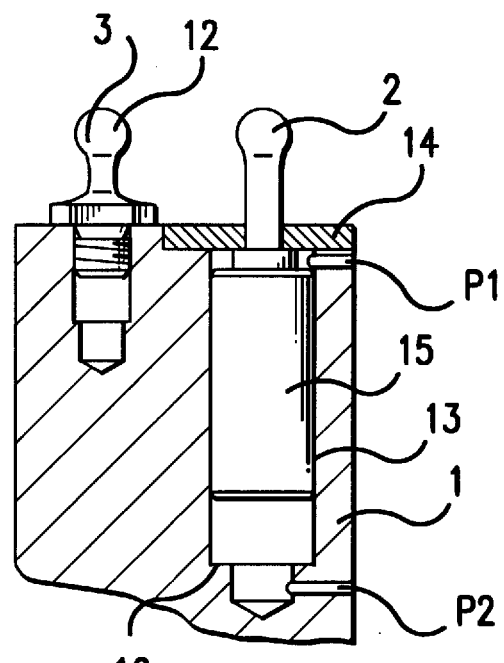
Figure 4:
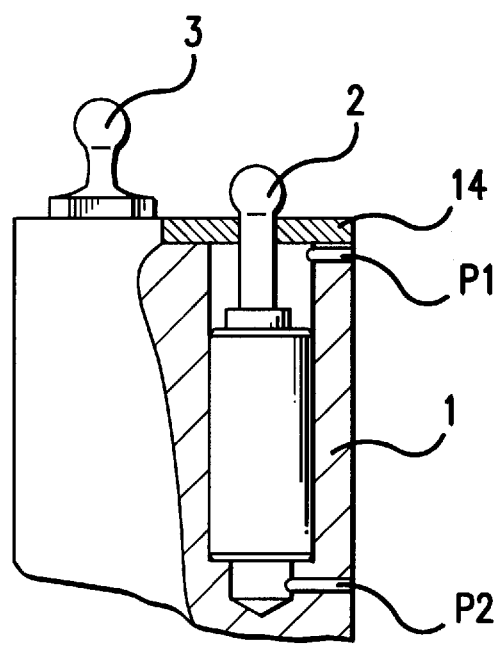

It can be seen in FIGS. 3 and 4 that the feeler pin 2, which leads the grinding disk 8, can be shifted in a direction parallel to the center line of the feeler pin 3. The feeler pin 3 is firmly connected with the positioning head 1, but nevertheless can be exchanged easily. The two feeler pins 2 and 3 have the same geometry in their head region 12. The configuration of this head region 12 is designed depending on the shape of the groove and on the grinding task.

The feeler pin 2 is constructed, so that it can be retracted automatically from the groove. In the example shown, the feeler pin 2 in the positioning head 1 is extended and retracted pneumatically by means of the pneumatic connections PI and P2. A further possibility for moving the feeler pin 2 consists of extending this pin by means of a compression spring and retracting it pneumatically. In the positioning head 1, the retractable feeler pin 2 is guided without clearance in a borehole 13 over a rear, thicker shaft part 15. The borehole 13 is closed off by a cover 14, which is screwed to the positioning head 1. This lid serves as a longitudinal stop for the extension of the feeler pin 2. During retraction, the rear end of the feeler pin 2 strikes against the base 16 of the borehole 13.

Figure 5:
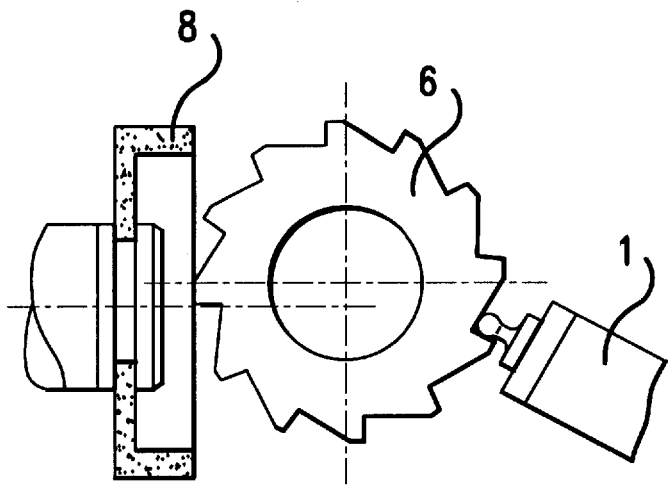
Figure 6:
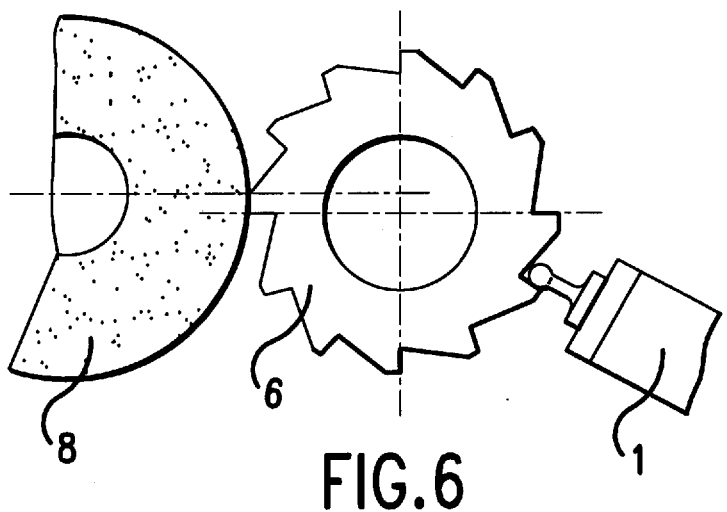

Some processing examples for the action of the grinding tool on the tool, which is to be reground, and for the engagement of the positioning device are shown in FIGS. 5 and 6.

It should be pointed out that not only tools with spiral grooves, but also tools with straight grooves can be reground with the inventive method and the inventive device. The positioning device described can be mounted on any tool-grinding machine for regrinding tools.

A further possibility for using this method or this device exists when regrinding tools with only one groove. The positioning head must then be designed in such a manner here, that one feeler pin is in front of the grinding pin and another is behind the grinding disk in the advancing direction. It should then be noted that the two feeler pins are disposed at a place in the groove, which does not lie within the grinding range of the grinding disk. Otherwise, the same principle is employed as in the preceding example.

I claim:

1. A method for regrinding a tool having at least one groove extending in a longitudinal direction therealong, the method comprising the steps of:

providing a positioning head in a fixed position, said positioning head including two feeler pins extending therefrom, the pins being receivable in said at least one groove;

rotatably securing the tool for movement in an advancement direction along an advancement axis common with a longitudinal axis of the tool;

advancing the tool until a first feeler pin of said two feeler pins is received in a selected groove of said at least one groove;

grinding the tool in a grinding position farther in the advancement direction than a position of said first feeler pin;

further advancing the tool until a second feeler pin of said two feeler pins is received in a one of said selected groove and another groove of said at least one groove, said grinding position being closer in the advancement direction that a position of said second feeler pin; and retracting said first feeler pin from receptive engagement within said selected groove before an end of said selected groove reaches the position of said first feeler pin.

2. The me tho d of claim 1, wherein the first feeler pin is retracted automatically.

3. The method of claim 1, wherein said selected groove engaged by at least one of said two feeler pins corresponds to a groove that is to be reground.

4. A device for regrinding a tool having at least one groove extending in a longitudinal direction therealong, the device comprising:

grinding means for grinding the tool;

a positioning head including two feeler pins extending therefrom, the pins being receivable in said at least one groove;

means for rotatably securing the tool for movement in an advancement direction along an advancement axis common with a longitudinal axis of the tool;

a first feeler pin of said two feeler pins positioned before said grinding means in said advancement direction, and a second feeler pin positioned after said grinding means in said advancement direction, said first feeler pin being received in a selected groove of said at least one groove upon advancement of the tool, said second feeler pin being received in a one of said selected groove and another groove of said at least one groove following continued advancement of the tool; and means for retracting the first feeler pin from said particular groove to permit retraction thereof before an end of said particular groove reaches a position of said first feeler pin.

5. The device of claim 4, wherein said first feeler pin is extendable and retractable pneumatically.

6. The device of claim 4, wherein said first feeler pin is extendable by means of a compression spring and retractable pneumatically.

7. The device of claim 5, wherein said feeler pins are exchangeable depending on a tool geometry.

8. The device of claim 7, wherein said positioning head is mounted on a freely movable clamping holder including means for fixing said positioning head after adjustment thereof in a desired position.

* * * * *